Patented June 8, 1943

2,321,148

UNITED STATES PATENT OFFICE 2,321,148

COFFEE PROCESSING

George William Kirby, Yonkers, William Redmond Johnston, Bronx, and Charles N. Frey, Scarsdale, N. Y., assignors to Standard Brands Incorporated, New York, N. Y., a corporation of Delaware No Drawing. Application November 22, 1940,
Serial No. 366,548

13 Claims. (Cl. 99—65)

The invention relates to a method for processing coffee and to a product for utilization therein. More particularly, it pertains to a procedure for the treatment of coffee during its preparation for market, and includes correlated improvements and discoveries whereby such treatment is facilitated.

An object of the invention is the provision of a method in accordance with which the mucilaginous coating of coffee beans may be readily removed.

Another object of the invention is to provide a method for effecting fermentation preceding removal of the mucilaginous coating of coffee beans, which may be easily, economically and effectively carried out to a desired extent.

A further object of the invention is the provision of a method for improving color and appearance of green coffee beans, and the aroma and flavor of beverage prepared therefrom.

A specific object of the invention is to provide a method for the removal of the mucilage from coffee beans by a fermentation occasioned through incorporation of yeast with pulped coffee beans or cherries, and a composition therefor containing a yeast and a malt and, if desired, a nitrogenous compound.

Other objects of the invention will in part be obvious and will in part appear hereinafter.

The invention accordingly comprises the several steps, and the relation of one or more of such steps with respect to each of the others, and the product possessing the features, properties, and the relation of constituents, which are exemplified in the following detailed disclosure, and the scope of the invention will be indicated in the claims.

In the practice of the invention coffee berries or cherries may be pulped in the customary manner, and yeast incorporated with the pulped beans so obtained. The mass is then permitted to undergo fermentation until the mucilaginous coating of the coffee beans is readily removable by water, whereupon the treated beans are washed until free from mucilage, followed by drying at a temperature which may be upwards to 80° C., more particularly at a temperature of 30° to 40° C., and finally the beans are hulled. The procedure may be carried out with utilization of either a fresh or a dry yeast, and we have found a dry yeast, which is resistant and stable with retention of activity for months at room temperature to be highly satisfactory.

A composition distinctly suitable for bringing about the fermentation is one containing a yeast in conjunction with a malt, and with this composition a small amount of a nitrogenous compound may be included, for example, urea, an amino acid, an ammonium compound, as diammonium hydrogen phosphate, ammonium dihydrogen phosphate and the chloride and sulfate. More particularly, the malt-yeast composition may contain about one part of dry yeast and two parts of a dry ground diastatic malt. The fermentation may take place at a temperature of 26.5° to 36° C., and for a period of from about 15 to 30 hours, or until the mucilaginous coating of the beans can be readily removed by washing with water. The amount of yeast employed may vary, and the percentage, based on the moist green coffee, when fresh yeast is used may be about 0.25% and with a dry yeast about 0.08%. The fermentation may be effected by the "dry" method in which surplus water is drained from the pulped beans and the yeast mixture dusted or sprayed thereupon.

Following incorporation of the yeast or yeast mixture the fermentation is carried out until the mucilaginous material can be removed readily and flavor is properly developed. The pulp retains sufficient moisture so that the entire mass is moist and the liquid present suffices to permit active fermentation. A procedure for dusting the yeast onto the coffee may be to apply the yeast while the fermentation tank is being filled, and then submerge the coffee in water for an hour or two by closing the drains, thereby occasioning a spreading of the yeast before starting the fermentation reaction.

Processing of the pulped beans may also be effected by permitting the pulp to drain completely; scattering the yeast or yeast mixture thereupon, and mixing to afford a uniform distribution of the yeast. This may be accomplished either by shoveling the pulp or running it through a suitable machine. Furthermore, the water may be permitted to accumulate for the purpose of bringing about a uniform distribution of the yeast and the fermentation may then proceed for a period of an hour or more until the yeast adheres to the pulp; after which the liquid is slowly drained away. When fermentation has ensued the beans are washed until free from mucilage, whereupon they are dried and hulled. Moreover, the yeast incorporated with the pulp may be a type having a high vitamin $B_1$ content, or such a yeast may accompany another having substantially a normal vitamin $B_1$ content whereby the rate of fermentation would be advantageously affected because of the additional vitamin $B_1$ present. Further, this effect may be occasioned also by accompanying the yeast with an amount of synthetic vitamin $B_1$ in the form, for example, of thiamin hydrochloride.

As an illustrative embodiment of a manner in which the invention may be practiced, the following description is presented. Coffee berries or cherries may be pulped, preferably by means of a suitable machine. The pulp thus obtained consists of the coffee beans carrying mucilaginous coating which is to be removed by controlled fermentation. Desirably, the pulped beans are washed and all floating beans are removed. The pulped beans may then be mixed with yeast, either fresh or dry, in an amount from 0.08 to 0.25%. The yeast added desirably may be as a composition containing a dry yeast and a malt. This composition may also include a nitrogenous salt, as an ammonium phosphate. Mixing of the yeast composition with the beans may be carried out by adding water in an amount sufficient to cover the beans, permitting the mixture thus obtained to stand for about 30 minutes at a temperature of 20 to 25° C., and allowing the water to drain therefrom. Fermentation of the drained beans with which yeast has been incorporated may take place at a temperature of about 30° C., with free access of air, and is permitted to continue until the mucilaginous material can be easily and completely washed away. When this condition is reached the beans have a rough rather than a jelly-like surface.

Washing of the beans is now effected by placing them in a suitable receptacle, as in a tank having a sieve or false bottom, into which water is introduced, and the mucilage removed by agitating the beans therein. If desired, the washing may be accomplished by scrubbing the beans in running water until free of mucilage, and then draining them on a suitable medium, as by means of a suction filter. The washed coffee beans free from mucilage may be dried at a temperature upwards to 80° C., and suitably from 30 to 40° C., after which they may be hulled and are ready for the market.

Furthermore, the drying of the washed beans may be effected by machine, as a rotary hot air dryer having a starting temperature of about 80° C., and a finishing temperature of from 50 to 60° C. Cup tests made with samples of beans processed with yeast fermentation for mucilage removal in comparison with beans processed in the usual manner, i. e., by adventitious fermentation, demonstrated that the aroma and flavor of the controlled fermentation beans are superior to the others. This was shown to be the case whether the cup test was made by the usual procedure in which ground coffee was present in the cup or when a carefully brewed coffee was prepared.

The foregoing procedure leads to the removal of the mucilage coating of coffee beans through a controlled fermentation effected by yeast, preferably in conjunction with a malt, and is attended by the following considerations: the cherries should be picked ripe and pulped before deterioration takes place; the pulped beans have a parchment covering over-laid with a mucilaginous layer which normally is a clear jelly, and it is undersirable to permit browning of this jelly to take place inasmuch as it then becomes difficult to break down the mucilage by fermentation which tends to production of a sour coffee; whole, immature or malformed beans are floated away when the pulped beans are washed to remove particles of the hull, etc.; addition of yeast in warm climates may desirably be dusted on using a filler and having the yeast as finely divided as possible, and the dusting may be accomplished as the coffee is placed in the fermenting tank in layers; addition of yeast may be effected by making a thin cream and spraying it upon the coffee as it is layered, or it may be added in the form of a starch or diatomaceous earth slurry to the pulping machine; and progress of the fermentation can be followed by the touch since the parchment covering has a rough surface when the mucilaginous substance is fully fermented.

Drying should be carried out at a relatively low temperature; usually within three to five hours the beans assume a dark grayish green appearance due to moisture leaving the surface of the bean, and as drying continues the color lightens throughout and the embryo portion is the last to dry. When the embryo turns to a lighter shade drying is usually stopped, and while overdrying is not injurious it is, however, uneconomical.

The processing of pulped green coffee beans through controlled fermentation by incorporation of yeast or a yeast-malt composition with the pulped beans has been found to be of distinct advantage for removal of the mucilaginous coating, and also that washed coffee so processed has an improved quality and flavor. It is believed that the yeast tends to develop an acidity and through utilization of the sugars and other available food materials it prevents the growth of undesirable organisms. Further, there is a saving of time in the fermentation, and the coffee produced by yeast possesses a very characteristic flavor, which is retained by the finished coffee. Additionally, the appearance of the coffee bean is improved. It has a rich greenish hue, and is without a mottled decolorized appearance which characterizes some beans fermented over long periods by incipient or natural fermentation. Moreover, the coffee processed in accordance with the foregoing disclosure possesses an excellent aroma and flavor, and because of this can be readily distinguished from coffees that have been treated in the usual manner.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A method for processing coffee, which comprises pulping coffee berries, incorporating yeast with the pulped beans, and fermenting until mucilaginous coating is readily removable by washing.

2. A method for processing coffee, which comprises pulping coffee berries, incorporating yeast with the pulped beans, fermenting at a temperature of 26.5° to 36° C. and subsequently washing to remove mucilaginous coating.

3. A method for processing coffee, which comprises pulping coffee berries, incorporating yeast with the pulped beans, fermenting for a period of 15 to 30 hours and subsequently washing to remove mucilaginous coating.

4. A method for processing coffee, which comprises pulping coffee berries, incorporating yeast with the pulped beans by dusting thereupon, and fermenting until mucilaginous coating is readily removable by washing.

5. A method for processing coffee, which comprises pulping coffee berries, incorporating yeast with the pulped beans by spraying thereupon, and fermenting until mucilaginous coating is readily removable by washing.

6. A method for processing coffee, which comprises pulping coffee berries, incorporating dry yeast with the pulped beans, and fermenting until mucilaginous coating is readily removable by washing.

7. A method for processing coffee, which comprises pulping coffee berries, incorporating dry yeast in an amount about 0.08% of the weight of the moist green coffee with the pulped beans, and fermenting until mucilaginous coating is readily removable by washing.

8. A method for processing coffee, which comprises pulping coffee berries, incorporating a composition containing yeast and malt with the pulped beans, and fermenting until mucilaginous coating is readily removable by washing.

9. A method for processing coffee, which comprises pulping coffee berries, incorporating a composition containing yeast, malt and a nitrogenous compound with the pulped beans, and fermenting until mucilaginous coating is readily removable by washing.

10. A method for processing coffee, which comprises pulping coffee berries, incorporating a composition containing one part dry yeast and two parts of a malt with the pulped beans, and fermenting until mucilaginous coating is readily removable by washing.

11. A method for processing coffee, which comprises pulping coffee berries, incorporating yeast with the pulped beans, fermenting until mucilaginous coating is readily removable by washing, and then washing until free from mucilage, drying, and hulling.

12. A method for processing coffee, which comprises pulping coffee berries, incorporating yeast with the pulped beans, fermenting until mucilaginous coating is readily removable by washing, and then washing until free from mucilage, drying at a temperature upwards to 80° C., and hulling.

13. A method for processing coffee, which comprises pulping coffee berries, incorporating yeast with the pulped beans, fermenting until mucilaginous coating is readily removable by washing, and then washing until free from mucilage, drying at a temperature of 30 to 40° C., and hulling.

GEORGE WILLIAM KIRBY.
WILLIAM REDMOND JOHNSTON.
CHARLES N. FREY.